United States Patent
Taivalkoski et al.

(10) Patent No.: US 6,290,760 B1
(45) Date of Patent: Sep. 18, 2001

(54) AIR SEPARATOR SYSTEM

(75) Inventors: Tom Taivalkoski, Fort Wayne, IN (US); Harald Görres, Weilheim (DE)

(73) Assignee: Tokheim Corporation, Fort Wayne, IN (US)

( * ) Notice: Subject to any disclaimer, the term of this patent is extended or adjusted under 35 U.S.C. 154(b) by 0 days.

(21) Appl. No.: 09/303,776

(22) Filed: Apr. 30, 1999

(51) Int. Cl.⁷ .............................. B01D 19/00; B67D 5/58
(52) U.S. Cl. ........................ 96/195; 96/156; 95/248; 222/72
(58) Field of Search .................. 95/248, 19, 266, 95/8, 261, 268, 269; 96/156, 174, 195, 196, 216, 167, 171; 222/72; 210/188

(56) References Cited

U.S. PATENT DOCUMENTS

| | | | |
|---|---|---|---|
| 2,188,848 | * 1/1940 | Svenson | 222/72 |
| 2,188,849 | * 1/1940 | Svenson . | |
| 2,275,355 | * 3/1942 | Finken | 96/167 |
| 2,276,839 | * 3/1942 | Grise | 222/72 |
| 2,292,007 | * 8/1942 | Morgan | 222/72 |
| 2,307,085 | * 1/1943 | Trexler | 222/72 |
| 2,322,568 | * 6/1943 | De Lancey . | |
| 2,415,835 | * 2/1947 | Moore et al. | 222/72 |
| 2,660,259 | * 11/1953 | Morehouse . | |
| 2,742,188 | * 4/1956 | Bills et al. | 222/72 |
| 2,779,503 | * 1/1957 | Wright et al. | 96/171 |
| 2,811,219 | * 10/1957 | Wenzl | 96/167 |
| 2,878,889 | * 3/1959 | Gilbert . | |
| 3,159,310 | * 12/1964 | Rafferty | 96/174 |
| 3,826,291 | * 7/1974 | Steffens | 141/59 |
| 4,222,751 | * 9/1980 | Shunta . | |
| 4,978,374 | * 12/1990 | Janssen et al. | 96/174 |
| 5,000,766 | * 3/1991 | Yano et al. . | |
| 5,017,198 | * 5/1991 | Schieg et al. . | |
| 5,141,535 | * 8/1992 | Elonen et al. . | |
| 5,363,988 | * 11/1994 | Saxton et al. | 222/72 |
| 5,579,740 | * 12/1996 | Cotton et al. . | |

* cited by examiner

*Primary Examiner*—Duane Smith
*Assistant Examiner*—Jason M. Greene
(74) *Attorney, Agent, or Firm*—Randall J. Knuth

(57) ABSTRACT

An apparatus and method for separating dissolved gasses from a fluid to produce de-aerated fluid which includes a fluid pump, a gas separator, and a vacuum pump for removing liberated dissolved gasses from the gas separator. In one particular embodiment, a unified pump/meter unit is used to both pump fluid, as well as volumetrically measure the amount of de-aerated fluid pumped.

14 Claims, 2 Drawing Sheets

AIR SEPARATOR SYSTEM

BACKGROUND OF THE INVENTION

1. Field of the Invention

The present invention relates to an air separator system for de-aerating fluid, and in particular, a system for use in conjunction with a fuel dispenser for de-aerating liquid fuel.

2. Description of the Related Art

Fuel dispensers contain a fuel storage tank, a fuel pump, and a fuel meter. The fuel pump, conducts fuel from the fuel storage tank and the meter measures the volume of fuel to be dispensed. Liquid fuel may contain dissolved gasses, for example, components of ambient air such as oxygen, nitrogen, etc., as well as hydrocarbons. These dissolved gasses contribute to the volume of fuel pumped from the fuel storage tank. In order to get an accurate measurement of the volume of liquid fuel to be dispensed, dissolved gasses must be removed from the fuel before metering. In addition, many fuel dispensers manufactured today contain a vapor recovery system. The vapor recovery system includes a vapor recovery pump for evacuating fuel vapors from the fuel tank of a vehicle being refueled.

Traditionally, fuel dispensers contain a gas or an air separator disposed downstream from the fuel pump. The fluid on the inlet side of the pump is in a vacuum and, consequently, the pressure is less than atmospheric air. The low pressure hampers effective air separation and removal. Conversely, the pressure on the downstream or outlet side of a fuel pump is greater than atmospheric air. Therefore, traditional fuel dispensers locate the air separator on the outlet side of a pump where the pressure is higher.

One problem with traditional fuel dispenser air separation systems is that the air separation system is located on the outlet side of a fuel pump. The pressure on the downstream or outlet side of a fuel pump is greater than atmospheric air. Pressure higher than atmospheric air assists in the removal of gasses liberated from liquid fuel. However, a less than atmospheric pressure on the inlet side of a pump hampers removal of liberated gasses in an air separator system. Consequently, many current air separation systems will not operate if located on the inlet side of a pump. Therefore, traditional fuel dispensers locate an air separation system on the outlet side of a fuel pump where the pressure is greater than atmospheric air.

A second disadvantage of current fuel dispensers air separator systems are that they do not contain a unified pump/meter unit. A unified pump/meter unit volumetrically measures the volume of fuel pumped for accurate measurement of the volume of fuel dispensed from a fuel dispenser. To accurately measure the volume of fuel to be dispensed, air and other dissolved gasses must first be removed from the liquid fuel before measuring the fuel volume. Since traditional fuel dispensers remove air and gasses on the outlet side of a pump, the meter must be located on the outlet side of a air separation system in order to get more accurate measurement. Consequently, traditional fuel dispensers do not contain a unified pump/meter to both pump fuel and provide an accurate measurement of fuel dispensers.

SUMMARY OF THE INVENTION

According to the present invention, a gas separator, along with vacuum means, are used for removing air and other dissolved gasses from a fluid prior to contact with a fluid pump. The invention, in one form thereof, is an apparatus for separating dissolved gases from a fluid to produce de-aerated fluid. The apparatus includes a fluid pump with a fluid pump inlet and a fluid pump outlet. The apparatus also contains a gas separator which has an upper portion with a gas outlet, a separator fluid inlet, and a separator fluid outlet. Vacuum means removes gas from the gas separator. The vacuum means is in communication with the gas outlet. In one embodiment, the separator fluid outlet is in fluid communication with the fluid pump inlet. In a further embodiment, the apparatus includes a separator gas sensing means operatively associated with the separator upper portion for detecting gas, a gas valve disposed between the gas outlet and the vacuum means, and a gas sensing controller operatively associated with the gas valve. In another, further embodiment, the gas separator is a centrifugal separator.

In another embodiment, the present invention is a method of producing de-aerated fluid. The method includes the steps of passing a fluid through a centrifugal separator and applying a vacuum to remove the gas from a portion of the separator. In one particular embodiment, a vapor recovery pump provides the vacuum means to remove the gas from the upper portion of a separator.

The invention, in yet another form thereof, is an apparatus for separating dissolved gases from liquid fuel to produce de-aerated fuel. The apparatus includes a pump/meter with a fluid pump inlet and a fluid pump outlet. The apparatus also includes a centrifugal separator having an upper portion with a gas outlet, a separator fluid inlet, and a separator fluid outlet. The separator fluid outlet is in fluid communication with the pump/meter inlet. Vacuum means removes gas from the centrifugal separator and is in communication with the gas outlet. A separator gas sensing means is operatively associated with the separator upper portion for detecting gas. A gas valve is disposed between the gas outlet and the vacuum means. A de-aerated fuel gas sensing means is operatively associated with the de-aerated fluid for detecting gas. A by-pass valve is in fluid communication with the fluid pump outlet. A gas sensing controller is operatively associated with said gas valve and said by-pass valve. In a further embodiment, a vapor recovery system with a vapor recovery pump provides the vacuum means.

The invention, in yet another form thereof, is an apparatus for separating dissolved gases from liquid fuel to produce de-aerated fuel. The apparatus includes a pump/meter with a fluid pump inlet and a fluid pump outlet. The apparatus also includes a centrifugal separator having an upper portion with a gas outlet, a separator fluid inlet, and a separator fluid outlet. The separator fluid outlet is in fluid communication with the pump/meter inlet. A Vacuum pump removes gas from the centrifugal separator and is in communication with the gas outlet. A separator gas sensor is operatively associated with the separator upper portion for detecting gas. A gas valve is disposed between the gas outlet and the vacuum pump. A de-aerated fuel gas sensor is operatively associated with the de-aerated fluid for detecting gas. A by-pass valve is in fluid communication with the fluid pump outlet. A gas sensing controller is operatively associated with said gas valve and said by-pass valve. In a further embodiment, a vapor recovery system uses the vacuum pump as a vapor recovery pump.

The invention, in yet another form thereof, is a fuel dispenser in which dissolved gases are separated from liquid fuel to produce de-aerated fluid. The fuel dispenser includes a dispenser tank, a hose with a nozzle and a fluid pump. The fluid pump has a fluid pump inlet and a fluid pump outlet. The fuel dispenser also contains a centrifugal separator. The centrifugal separator has a gas outlet, a separator fluid inlet, and a separator fluid outlet. Vacuum means removes gas from the centrifugal separator. The vacuum means is in communication with the gas outlet. In one embodiment, the separator fluid outlet is in fluid communication with the fluid pump inlet. In a further embodiment, the fuel dispenser includes a separator gas sensing means operatively associated with the centrifugal separator for detecting gas, a gas valve disposed between the gas outlet and the vacuum means, and a gas sensing controller operatively associated with the gas valve.

An advantage of the present invention is that the air separator system is located on the inlet or upstream side of a pump rather than the outlet or downstream side of the pump. The centrifugal separator with vacuum means allows for effective separation of dissolved gases from a liquid even when the air separator system is located on the inlet side of a pump.

Another advantage of the present invention is the ability for a fuel dispenser to utilize a unified pump/meter unit. The fluid is de-aerated by an air separation system located on the inlet side of a pump. Therefore, since de-aerated fluid is being pumped through the pump/meter unit, a more accurate volumetric measurement may be made of the fluid.

An additional advantage of the present invention is the utilization of current fuel dispenser components to provide the vacuum means for the air separation system. Currently, many fuel dispensers manufactured today include a vapor recovery system. The vapor recovery system includes a vapor recovery pump for removing fuel vapors from a vehicle's fuel tank, dispenser nozzle, or surrounding area during refuelling. In one embodiment of the present invention, the vapor recovery pump provides the vacuum means for the air separation system. The advantage of using an existing vapor recovery pump as the vacuum means allows for the present invention to be installed in current fuel dispenser designs without installing additional vacuum means for the air separation system. Therefore, the cost of installation and manufacturing is reduced.

Another advantage of the present invention is the ability to cease application of vacuum to the air separation system when gas is not detected in the upper portion of the centrifugal separator.

Yet another advantage of the present invention is the presence of a by-pass valve which redirects de-aerated fuel back to the centrifugal separator. In one particular embodiment, a de-aerated fuel sensing means detects the presence of dissolved gases within the de-aerated fuel. When dissolved gases are detected, the by-pass valve redirects de-aerated fuel back to the centrifugal separator so that the detected dissolved gasses can be sepdrated from the fuel. Through possible repeated cycles, only fluid which contains dissolved gasses below a predetermined level or below the level of detection of the de-aerated fuel sensing means will be allowed to proceed past the by-pass valve. Consequently, the fuel dispenser will only dispense fuel which has first been properly de-aerated prior to being volumetric measured by a pump/meter unit.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

Corresponding reference characters indicate corresponding parts throughout the several views. The exemplification set out herein illustrates one preferred embodiment of the invention, in one form, and such exemplification is not to be construed as limiting the scope of the invention in any manner.

DETAILED DESCRIPTION OF THE INVENTION

Figure 1:
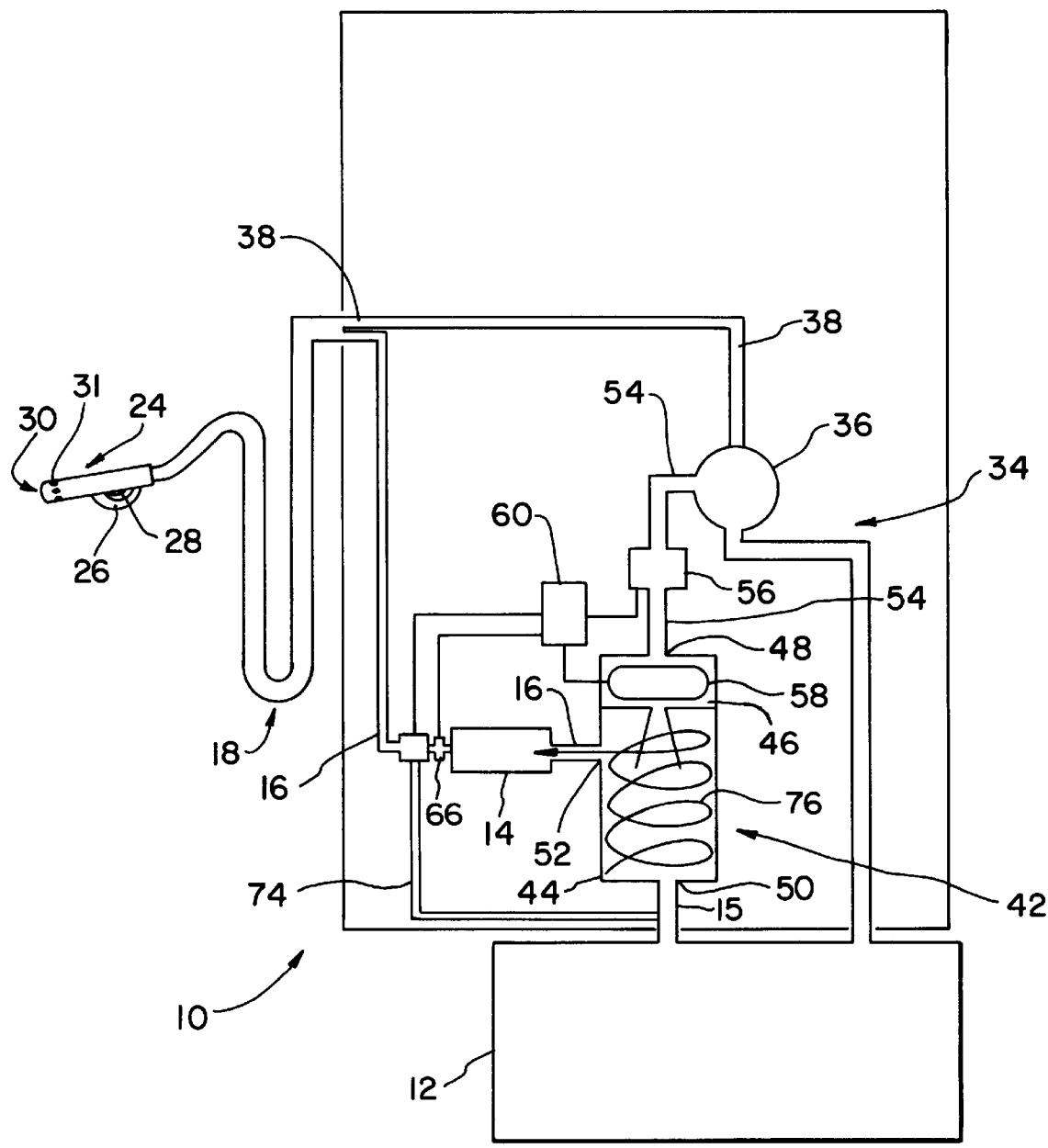
FIG. 1 is a sectional view of a fuel dispenser incorporating the present invention.

Referring now to the drawings and particularly to FIG. 1, there is shown a fuel dispenser 10 which incorporates the present invention. Fuel dispenser 10 includes a dispenser tank 12. A fluid pump, fuel pump/meter unit 14, when activated, pumps fuel from fuel tank 12 through fuel supply conduit 15 and fuel conduit 16 to hose 18. Hose 18 is connected to nozzle 24. Nozzle 24 contains handle 26 and lever 28. Nozzle 24 also contains an outlet 30, from where fuel is dispensed. A plurality of apertures are disposed annularly around nozzle 24 near outlet 30 and form inlet port 31.

Vapor recovery system 34 includes vacuum pump 36, vapor recovery conduit 38, and dispenser tank 12. During the operation of vapor recovery system 34, vacuum pump 36 removes vapors from the environment directly outside of inlet port 31. The vapors are evacuated through hose 18 under negative pressure generated by vacuum pump 36. The collected or recovered vapors proceed through vapor recovery conduit 38, passing through vacuum pump 36 and onto the dispenser tank 12. Hose 18 contains an inner fuel hose surrounded by an outer vapor recovery hose (not shown).

During the operation of fuel dispenser 10, fuel is dispensed from dispenser tank 12 through fuel conduits 15, 16 through the inner fuel hose of hose 19 and out of nozzle 24 through outlet 30. In addition, fuel vapor is evacuated through inlet 31 through outer vapor recovery hose and into vapor recovery conduit 38.

Figure 2:
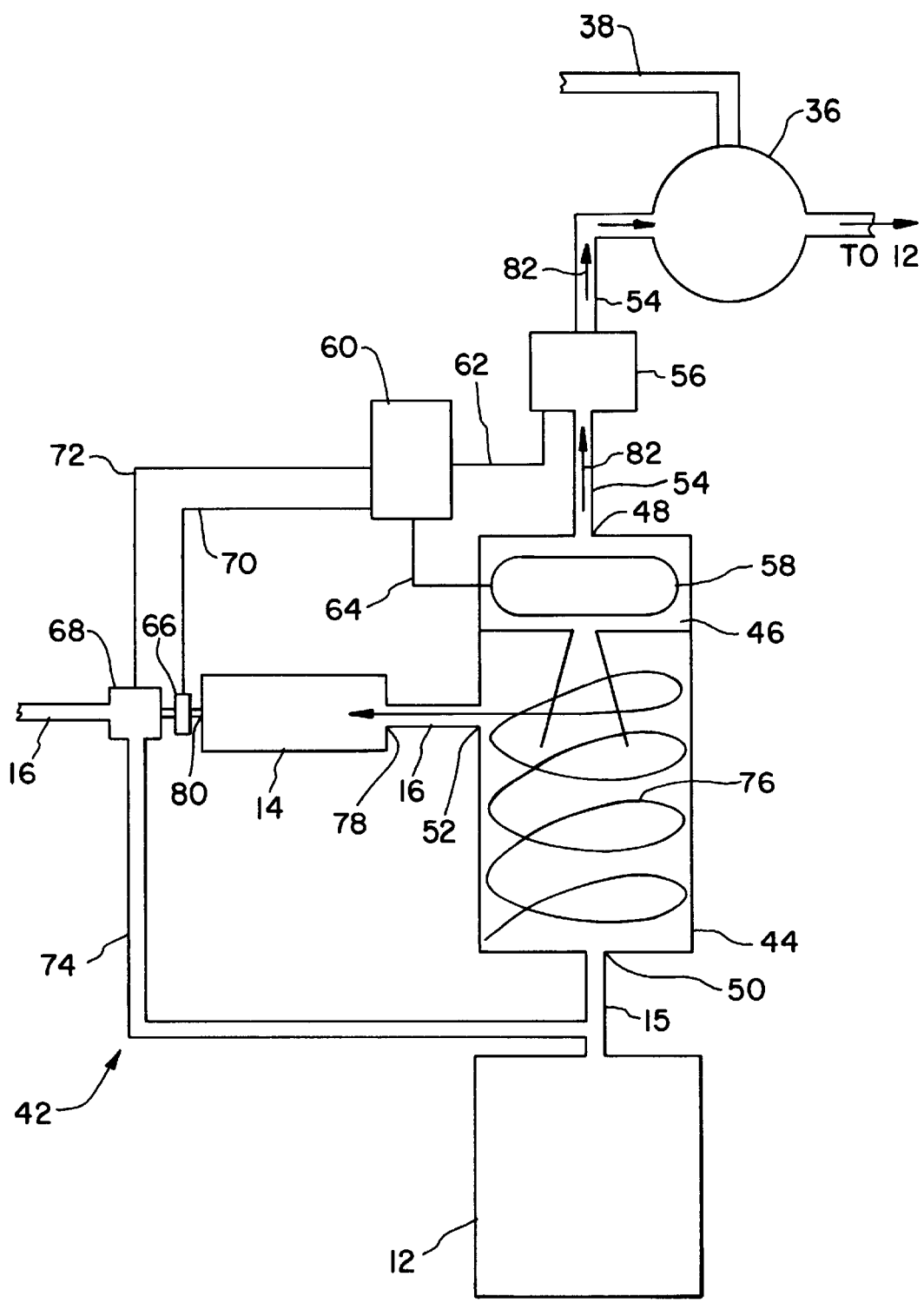
FIG. 2 is a sectional view of an air separator system of the present invention.

Referring now to FIG. 2, there is shown air separator system 42 of the present invention. Air separator system 42 contains a gas separator such as centrifugal separator 44. Centrifugal separator 44 has an upper portion 46 with gas outlet 48. Centrifugal separator 44 also contains separator fuel inlet 50 and separator fuel outlet 52. Fuel conduit 16 connects separator fuel outlet 52 to pump/meter 14. Fuel supply conduit 15 connects separator fuel inlet 50 to dispenser tank 12.

Gas conduit S4 connects gas outlet 48 Lo gas valve 56. Gas conduit 54 joins gas valve 56 to vacuum pump 36. Separator gas sensing means 58 is operatively associated with separator upper portion 46 and contains a separator gas sensor. A mechanical, electrical, or electronic means, such as gas controller 60, is operatively associated with gas valve 56 and gas sensing means 58 by lines 62 and 64 respectively.

De-aerated fluid gas sensing means 66 is located in line between pump/meter unit 14 and by-pass valve 68. Aerated fluid gas sensing means comprises a de-aerated fluid gas sensor. De-aerated fluid gas sensor means 66 and by-pass valve 68 are operatively associated with gas controller 60 by lines 70 and 72 respectively. By-pass conduit 74 connects by-pass valve 68 to supply fuel conduit 15.

During the operation of the present invention, pump/meter 14 pumps fuel from dispenser tank 12 through fuel supply conduit 15 into centrifugal separator 44. The interior of centrifugal separator 44 causes the fuel to spin, as depicted by line 76. Centrifugal separator 44 separates or liberates dissolved gas from the fuel to produce de-aerated fuel.

The de-aerated fuel exits centrifugal separator 44 through separator fuel outlet 52 and proceeds through fuel conduit 16 into pump/meter inlet 78. Pump/meter 14 both pumps fuel from dispenser tank 12, and volumetrically measures the amount of fuel to be dispensed by fuel dispenser 10.

Pump/meter unit 14 measures the volume of de-aerated fuel which is pumped. For example, pump/meter unit 14 can be a reciprocating electromechanical piston meter with a sliding mechanical piston. The pump/meter calculates volume by using the known volume of the piston cylinder and counting the number of strokes the piston reciprocates within the cylinder.

De-aerated fuel exits pump/meter 14 through pump/meter outlet 80 and proceeds past de-aerated fluid gas sensing means 66. De-aerated fluid gas sensing means 66 detects the presence of dissolved gasses within the de-aerated fuel or fluid. De-aerated fluid gas sensing means 66 sends a signal through line 70 to gas controller 60 to indicating the presence of dissolved gasses. When gas controller 60 receives the signal from de-aerated gas sensing means 66 indicating the presence of dissolved gas, gas controller 60 sends a signal through line 72 to by-pass valve 68. By-pass valve 68, upon receiving the signal from gas controller 60, redirects de-aerated fuel from fuel conduit 16 to by-pass conduit 74. Consequently, de-aerated fluid in which dissolved gasses are still present, as detected by de-aerated fluid gas sensing means 66, is returned to centrifugal separator 44 through fuel supply conduit 15. This cycle is repeated until the presence of dissolved gasses is no longer detected by de-aerated fluid gas sensing means 66 or the quantity of dissolved gasses is below a predetermined value. By-pass valve 68 and by-pass conduit 74 provide quality control to assure only properly de-aerated fluid is measured by pump/meter 14.

Dissolved gasses, which are separated in centrifugal separator 44 from liquid fuel proceeds into the centrifugal separator upper portion 46. Vacuum pump 36 provides a vacuum to centrifugal separator upper portion 46. Dissolved gasses proceed under a vacuum or negative pressure through gas conduit 54 in the direction of arrow 82 and pass through gas valve 56. Separator gas sensing means 58 detects the presence of liberated dissolved gasses within centrifugal separator upper portion 46. Upon sensing liberated dissolved gasses, separator gas sensing means 58 sends a signal through line 64 to gas controller 60. When gas controller 60 receives a signal from separator gas sensing means 58 indicate the presence of liberated dissolved gasses, gas controller 60 sends a signal through line 62 to gas valve 56. Gas valve 56, upon receiving a signal from gas controller 60, opens gas valve 56 allowing gas to be evacuated from separator upper portion 46. Conversely, in the absence of detected liberated gas in separator upper portion 46, gas controller 60 sends a signal through line 62 to close gas valve 56 whereby ceasing the vacuum applied to centrifugal separator upper portion 46.

The liberated dissolved gasses from the liquid fuel can be stored along with fuel vapor recovered by the vapor recovery system 34 in dispenser tank 12. The vacuum means for removing gas from centrifugal separator 44 is vacuum pump 36 which may also used in vapor recovery system 34. Alternatively, other vacuum means may be utilized in the air separator system 42. In other words, vacuum means does not necessarily have to be the same vacuum pump 36, which is used in vapor recovery system 34. In addition, a separate pump and meter may be used rather than a single pump/meter unit 14.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. An apparatus for separating dissolved gasses from a fluid to produce de-aerated fluid, comprising:

a fluid pump with a fluid pump inlet and a fluid pump outlet;

a centrifugal gas separator, said separator having an upper portion with a gas outlet, a separator fluid inlet, and a separator fluid outlet, said separator fluid inlet in communication with said fluid pump outlet;

a by-pass circuit for returning de-aerated fluid to said gas separator; and vacuum means for removing gas from said gas separator; said vacuum means in communication with said gas outlet;

wherein the input vacuum flow operatively communicated into said vacuum means from said gas separator being in a substantially gaseous state.

2. The apparatus of claim 1 wherein said fluid pump comprises a pump/meter unit.

3. The apparatus of claim 2 wherein said separator fluid outlet is in fluid communication with said fluid pump inlet.

4. The apparatus of claim 1, further comprising:

a separator gas sensing means operatively associated with said separator upper portion for detecting gas;

a gas valve disposed between said gas outlet and said vacuum means; and a gas sensing controller operatively associated with said gas valve.

5. The apparatus of claim 1, further comprising a de-aerated gas sensing means operatively associated with said de-aerated fluid for detecting gas.

6. The apparatus of claim 5, further comprising:

a by-pass valve disposed on the outlet side of said fluid pump.

7. The apparatus of claim 1 wherein the apparatus is connected to a fuel dispenser.

8. The apparatus of claim 7 wherein said fuel dispenser comprises a vapor recovery system with a vapor recovery pump, said vapor recovery pump providing said vacuum means.

9. An apparatus for separating dissolved gasses from liquid fuel to produce de-aerated fuel, comprising:

a pump/meter with a fluid pump inlet and a fluid pump outlet;

a centrifugal separator, said separator having an upper portion with a gas outlet, a separator fluid inlet, and a separator fluid outlet, said separator fluid outlet is in fluid communication with said pump/meter inlet;

vacuum means for removing gas from said centrifugal separator; said vacuum means in communication with said gas outlet;

a separator gas sensing means operatively associated with said separator upper portion for detecting gas;

a gas valve disposed between said gas outlet and said vacuum means;

a gas sensing controller operatively associated with said gas valve;

a de-aerated fluid gas sensing means operatively associated with said de-aerated fluid for detecting gas; and a by-pass circuit for returning de-aerated fluid to said separator.

10. The apparatus of claim 9, further comprising a vapor recovery system with a vapor recovery pump, said vapor recovery pump providing said vacuum means.

11. An apparatus for separating dissolved gasses from liquid fuel to produce de-aerated fuel, comprising:

a pump/meter with a fluid pump inlet and a fluid pump outlet;

a centrifugal separator, said separator having an upper portion with a gas outlet, a separator fluid inlet, and a separator fluid outlet, said separator fluid outlet is in fluid communication with said pump/meter inlet;

vacuum pump for removing gas from said centrifugal separator; said vacuum pump in communication with said gas outlet;

a separator gas sensor means operatively associated with said separator upper portion for detecting gas;

a gas valve disposed between said gas outlet and said vacuum pump;

a gas sensing controller operatively associated with said gas valve;

a de-aerated fluid gas sensor operatively associated with said de-aerated fluid for detecting gas; and a by-pass circuit for returning de-aerated fluid to said separator.

12. The apparatus of claim 11, further comprising a vapor recovery system; said vapor recovery system using said vacuum pump as a vapor recovery pump.

13. A fuel dispenser in which dissolved gasses are separated from liquid fuel to produce de-aerated fuel, comprising:

a dispenser tank;

a hose with a nozzle;

a fluid pump with a fluid pump inlet and a fluid pump outlet; said fluid pump in fluid communication with said dispenser tank and said nozzle;

a centrifugal separator having a gas outlet, a separator fluid inlet, and a separator fluid outlet, said separator fluid outlet in fluid communication with said fluid pump inlet;

vacuum means for removing gas from said centrifugal separator; said vacuum means in communication with said gas outlet;

a separator gas sensing means operatively associated with said separator upper portion for detecting gas;

a gas valve disposed between said gas outlet and said vacuum means;

a gas sensing controller operatively associated with said gas valve;

a de-aerated fluid gas sensing means operatively associated with said de-aerated fluid for detecting gas;

a by-pass circuit for returning de-aerated fluid to said separator; and wherein the input vacuum flow operatively communicated into said vacuum means from said centrifugal separator being in a substantially gaseous state.

14. The fuel dispenser of claim 13 wherein said fuel dispenser comprises a vapor recovery system with a vapor recovery pump, said vapor recovery pump providing said vacuum means.

* * * * *